(12) United States Patent
Chen

(10) Patent No.: US 8,009,657 B2
(45) Date of Patent: Aug. 30, 2011

(54) MEDIUM TIME ALLOCATION AND SCHEDULING USING ISO-ZONE STRUCTURED SUPERFRAME FOR QOS PROVISIONING IN WIRELESS NETWORKS

(75) Inventor: Richard Chen, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 816 days.

(21) Appl. No.: 11/912,516

(22) PCT Filed: Apr. 24, 2006

(86) PCT No.: PCT/IB2006/051269
§ 371 (c)(1),
(2), (4) Date: Oct. 25, 2007

(87) PCT Pub. No.: WO2006/114755
PCT Pub. Date: Nov. 2, 2006

(65) Prior Publication Data
US 2008/0144597 A1    Jun. 19, 2008

Related U.S. Application Data

(60) Provisional application No. 60/674,495, filed on Apr. 25, 2005.

(51) Int. Cl.
*H04J 3/00* (2006.01)
(52) U.S. Cl. .................................. 370/345; 370/442
(58) Field of Classification Search .................. 370/345, 370/470, 476, 468, 329, 442
See application file for complete search history.

(56) References Cited

U.S. PATENT DOCUMENTS

| 2004/0156312 | A1* | 8/2004 | Salonidis et al. ............. 370/229 |
| 2005/0013267 | A1  | 1/2005 | An |
| 2005/0015494 | A1* | 1/2005 | Adamczyk et al. ........... 709/226 |
| 2005/0063330 | A1* | 3/2005 | Lee et al. ..................... 370/328 |
| 2005/0064873 | A1* | 3/2005 | Karaoguz et al. .......... 455/452.2 |

FOREIGN PATENT DOCUMENTS

WO    WO03/079579 A1    9/2003

OTHER PUBLICATIONS

By A.G. Ruzzelli et al. Entitled: "On the Design of an Energy-Efficient Low-Latency Integrated Protocol for Distributed Mobile Sensor Networks" Dept. of Computer Science, University of Twente, The Netherlands and Dept. of Electronic Engineering, Universita degli stude di Ferrara, Italy. p. 1-10. XP010846677.
By A. Rangnekar et al. Entitled: "Multiple Channel in UWB Based IEEE 802.15.3 Networks", Department of CSEE, University of Maryland, Baltimore County, Baltimore, MD 21250, pp. 1-10.

* cited by examiner

*Primary Examiner* — Brian D Nguyen

(57) ABSTRACT

Allocation of contiguous blocks of airtime for data or airtime transmission can lead to large maximum service intervals for an application stream. This may result in a large delay bound where large blocks of contiguous MAS blocks other applications from meeting their low-latency requirements. A method and network that overcomes at least the shortcomings of known methods includes transmitting information over a wireless network. This includes the steps of: organizing the shared medium into periodical superframes; organizing the superframe into allocation zones; organizing the allocation zones into iso-zones; generating an allocation map; determining a periodic service interval and medium time based on a TSPEC including a latency requirement of an application stream, and local resource of the transmitting device; searching for transmission opportunity that accommodates the periodic service interval and the medium time required based on the allocation map; transmitting information in the superframe upon finding transmission opportunity in the searching step.

9 Claims, 6 Drawing Sheets

MEDIUM TIME ALLOCATION AND SCHEDULING USING ISO-ZONE STRUCTURED SUPERFRAME FOR QOS PROVISIONING IN WIRELESS NETWORKS

This Application claims the benefit of priority from prior U.S. application 60/674,495, filed Apr. 25, 2005, the teachings of which are herein incorporated by reference.

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), as well as audio/visual streaming, video/audio telephony, stationary computers in wireless networks, and portable handsets, to name only a few).

Each wireless network includes a number of layers and sub-layers, such as the Medium Access Control (MAC) sub-layer and the Physical (PHY) layer. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While standards and protocols have provided for significant improvement in the control of data traffic, the continued increase in the demand for network access at increased channel rates while supporting quality-of-service (QoS) requirements for multimedia traffic such as voice or video have required a continuous evaluation of protocols and standards and changes thereto. For example, many known protocols such as the WiMedia Ultra-Wide Band (UWB) MAC 1.0 (published as ECMA standard 368) and other non-slot based WLANs such as IEEE 802.11e, require network-layer QoS signaling protocols to pass QoS requirements of applications to network nodes along the path the applications traverse in the form of Traffic Specification (TSPEC). The Station Management Entity (SME) located in each of such network nodes passes down the TSPEC it receives to MAC Layer Management Entity (MLME). Upon receiving the TSPEC of the application stream, the MLME in MAC layer reserves networking resources to meet the QoS requirements. In various MAC protocols, one such resource is the medium time, or airtime for transmission of data or other information. QoS provisioning in these wireless MAC protocols usually involves allocation of airtime according to a QoS requirement specified, for example, in the TSPEC. For example, in slot-based MAC protocol, such as the WiMedia UWB MAC, there are various ways to allocate media access slot (MAS) (e.g., medium access time) that result in performance differences in latency, bandwidth efficiency, power saving performance, etc.

Contiguous medium time allocation is usually preferred to maximize bandwidth efficiency as well as power efficiency. However, Allocation of contiguous blocks of airtime for data transmission can lead to large maximum service intervals for an application stream. This may result in a large latency where large blocks of contiguous airtime is likely to block other applications from meeting their low-latency requirements. Additionally, too many smaller distributed fragments of airtime allocation over the course of a superframe may also not enable successful transmission of an entire packet, therefore results in lower bandwidth efficiency What is needed, therefore, is a method and system that substantially overcomes at least the shortcomings of known methods described and as a result, to accommodate applications with various QoS requirements such as high-efficiency and low-latency, to coexist In accordance with an example aspect, a method of transmitting information over a wireless network includes the steps of: organizing the superframe into a plurality of allocation zones; organizing the allocation zones into iso-zones; generating an allocation map; determining a periodic service interval based on a TSPEC including a latency requirement of an application stream, and local resource of the transmitting device; determining a medium time requirement based on the TSPEC including a latency requirement of an application, and local resource of the transmitting device; searching for transmission opportunity that accommodates the periodic service interval and the medium time required based on the allocation map; transmitting information in the superframe upon finding transmission opportunity in the searching step.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 1:
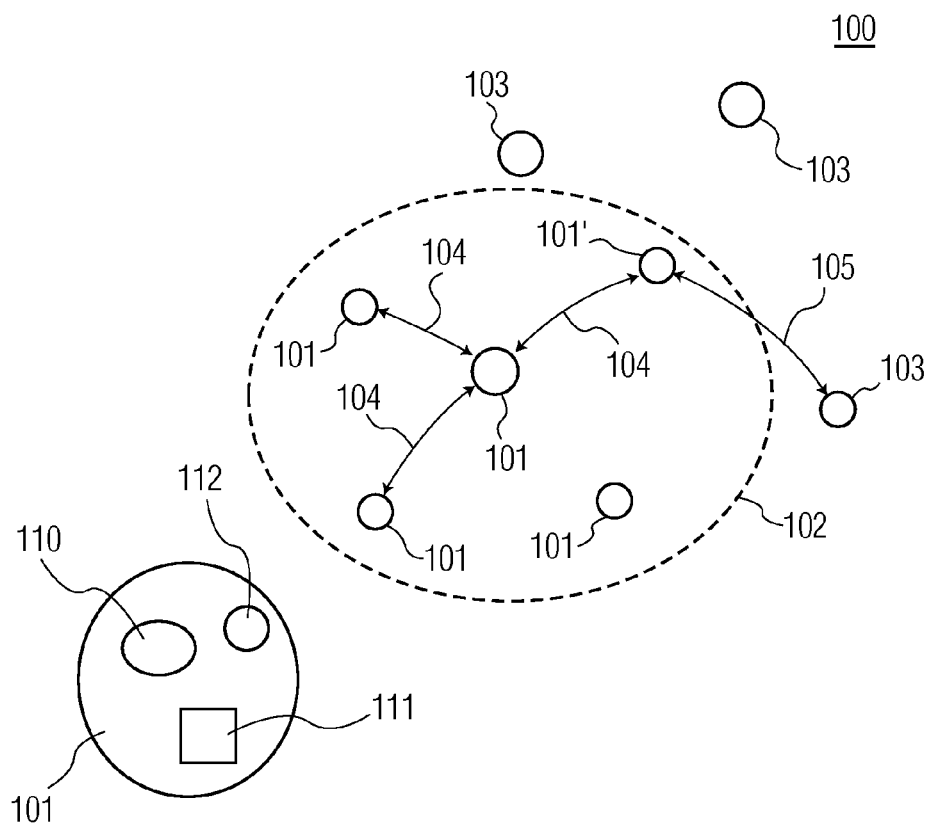
FIG. 1 is a diagram representative of wireless communication network system sharing a medium in accordance with an example embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

Briefly, in accordance with illustrative embodiments, methods and system are described that improve the efficiency and throughput in a distributed wireless network while satisfying wide-range latency requirements from various applications. The methods and system calculate the maximum service interval that will meet the TSPEC including latency requirement of one or more application streams. This is accomplished, for example, by organization of wireless medium into periodical iso-zones; searching for transmission opportunity in the ascending order of iso-zone indices; and by allocating contiguous MAS (i.e., portions of media access time) to minimize power loss due to numerous "wake-up" operations.

In accordance with the example embodiments described herein, distributed (i.e., slot-based) wireless networks operate under WiMedia MAC 1.0. Of course, this is merely illustrative, and other MAC protocols may incorporate the sharing of availability of the devices within the network that are described in connection with the example embodiments. These include, but are not limited to, the progeny of the current WiMedia MAC protocol, as well as other carrier sense multiple access with collision avoidance (CSMA/CA) protocols or Time Division Multiple Access (TDMA) protocols. Additionally, the embodiments described herein may also apply to WLANs having non-slot based media access, such as IEEE 802.11 WLAN. It is emphasized that these protocols are merely illustrative and that other protocols within purview of one of ordinary skill in the art may be implemented in accordance with the example embodiments.

FIG. 1 is a schematic diagram of a wireless network system that includes plurality of wireless devices or systems sharing a communications medium (i.e., co-existing) in accordance with an example embodiment. Wireless devices/systems 101 may transmit or receive (or both) traffic 104 to from other wireless devices 101 within their transmission range 102. Moreover, there may be other wireless devices/systems 103 that are outside the range 102 of certain wireless devices/systems 101, but within the range of certain devices 101'. Wireless devices 101 contain a transceiver 110 (e.g., any known transmitter/receiver combination, or a separate transmitter and receiver), a processors 111 (e.g., any known device which processes bits of information), and a power source 112 (e.g., a battery).

Figure 2:
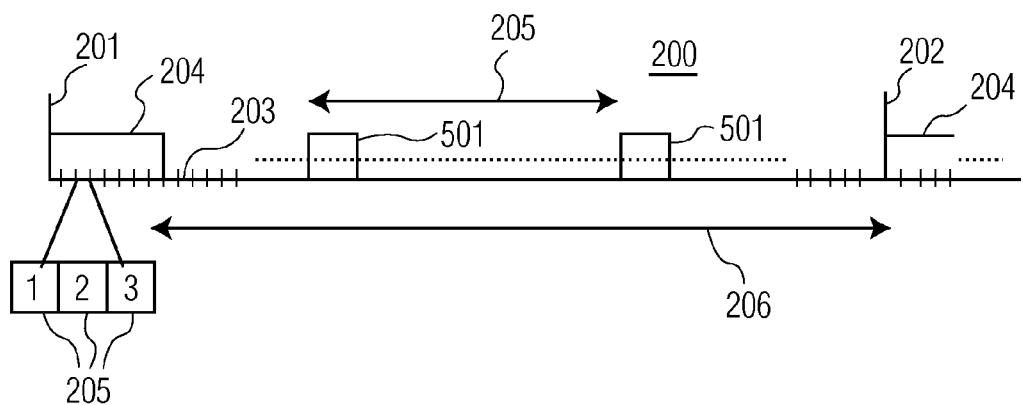
FIG. 2 is a time-line of a superframe in accordance with an example embodiment.

Wireless medium is first organized into periodical and contiguous pieces called superframes. FIG. 2 is a time line 200 of a superframe between a first beacon 201 and a second beacon 202. As used herein, the starting point of the beacons is referred to as the Beacon Period Start Time (BPST), and there is a prescribed period of time between beacons. In an example embodiment, the superframe is divided into a plurality of medium access slots (MAS) 203, which provide for organized transmission and reception in keeping with the example embodiments. In an illustrative embodiment, there are 256 slots 203, with each slot having a duration of approximately 256 μs, so the entire duration of the superframe is approximately 65.536 ms in the example embodiment (thus 65.536 ms between BPSTs). Of course the number and duration of the slots 203 is merely for purposes of illustration and are in no way limitations of the slots 203.

At the beginning of each superframe there is a beacon period 204. As will become clearer as the present description continues, the beacon period 204 provides the vehicle for the sharing of availability information of the devices/systems (e.g., devices 101, 103) of the network 100, as well as the needs of devices/systems to send traffic to other devices/systems of the wireless network 100 of the example embodiments.

After the beacon period 204 is a data transfer period 206 that may contain a plural of service intervals 205. In slot-based medium access, each data transfer period is further divided into a certain number of medium access slots. Different application streams require different numbers of slots 203 to ensure adequate medium access time for complete packet transmission. A processor in a transmitter determines how much of the medium time it requires to transmit its data packets. This determination occurs by analyzing TSPEC (of the application stream) including bandwidth requirements, latency requirements and packet sizes and other local resource such as buffer space of the transmitting device. Additionally, service intervals are periodic (i.e., occurring over several cycles of beacon period 204 and data transfer period 206, or simply a superframe).

To calculate the periodic service interval, a processor (e.g., processor 111 in FIG. 1) calculates a service rate g according to a TSPEC and local resource, such as buffer space required to temporally store packets when wireless medium or system processing resource is unavailable. The processor also calculates the queuing delay $d_q$ caused by burstiness of the application stream (measured as burst size field in TSPEC) by using the calculated g at which the stream is served. The maximum service interval 205 can be calculated by based on the latency requirement, for example, as follows:

$$SI \leq d_s - d_q$$

where $d_s$ is the delay requirement and $d_q$ is the additional queuing delay caused by the burst burstiness of the application stream.

Figure 3:
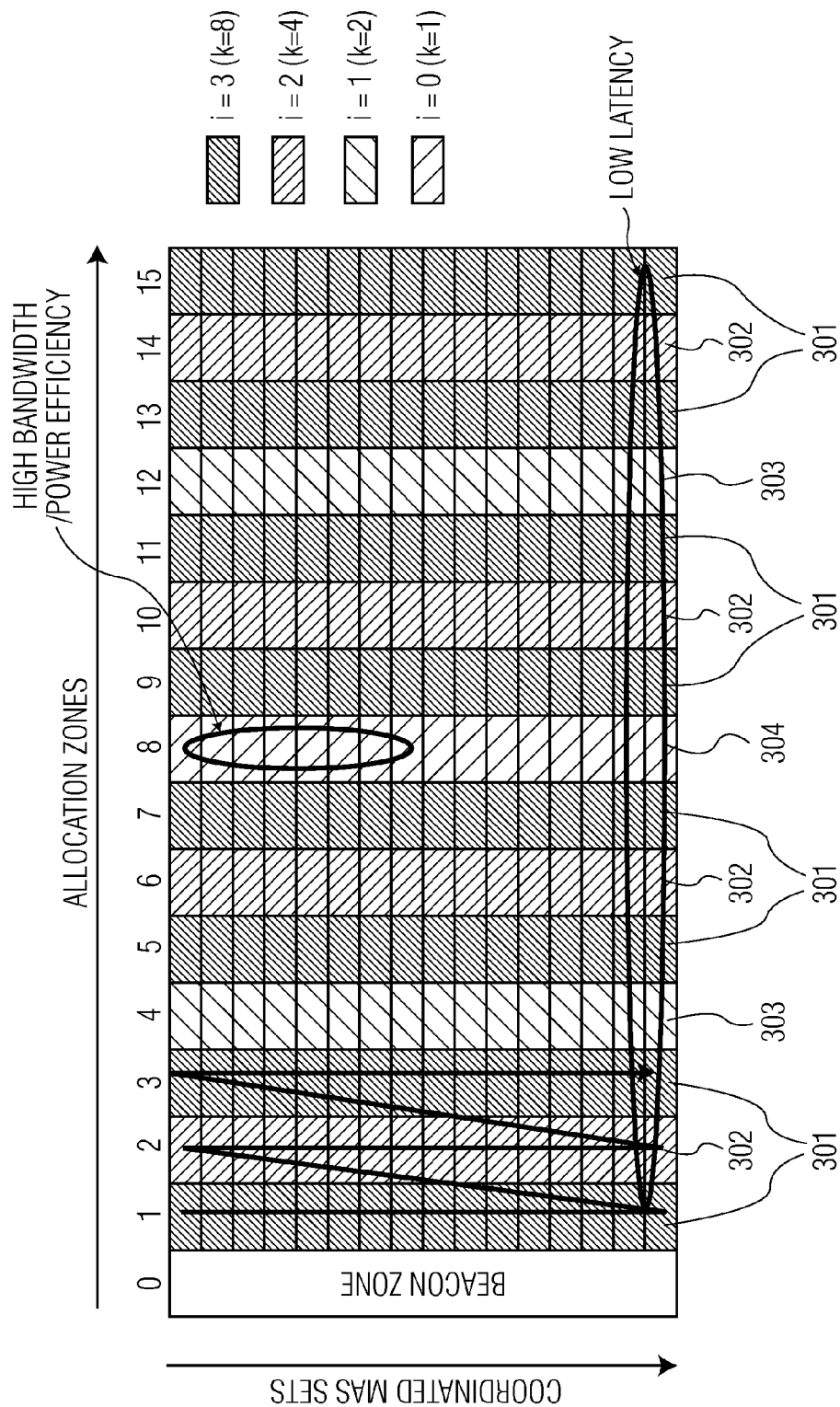
FIG. 3 is a two dimensional representation of a superframe.

FIG. 3 depicts a two-dimensional representation of superframe 200. The y-axis of the representation is MAS increasing sequentially in timeline in the downward direction for slot based systems such as UWB or transmission opportunity in medium progressing in timeline in the downward direction for non-slot-based systems such as IEEE 802.11. The x-axis of the representation is allocation zone that increases sequentially in timeline in the horizontal direction (i.e., from left to right on the figure). Allocation zones 1-15 represent a contiguous grouping of transmission opportunity, for example, MAS. Sequentially in time, MAS where x=2 and y=1 follows MAS where x=1 and y=15. According to the prior art, incoming application streams were pre-assigned either a high-efficiency scheme or a low-latency scheme, depending on QoS requirements of the application specified in the form of TSPEC. In a low-latency scheme, data transmission occurs exclusively in MAS slots (e.g., row components) where x=1, y=15; x=2, y=15, . . . , x=15, y=15. 4. For a high-efficiency scheme, contiguous MAS blocks are utilized.

In order that MAS are allocated accounting for both application service interval requirements as well as reservations of contiguous blocks of MAS, iso-zones 301-304 are organized to parse out transmission opportunity in an efficient manner.

Figure 4:
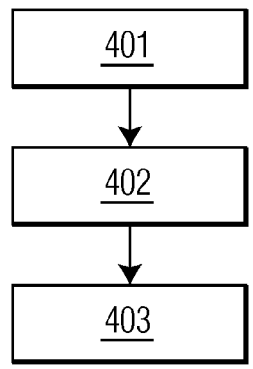
FIG. 4 is a flow chart depicting a method of organizing iso-zones.

FIG. 4 depicts a method for parsing a superframe into allocation zones 1-15. For non-slot based systems, such as 802.11e, a scheduler in a QoS access point (QAP) is responsible for scheduling medium access for application streams. First, in step 401, a scheduler determines the minimum service interval the wireless network can accommodate or according to all the service interval requirements of existing applications streams. The scheduler then divides the duration of the superframe by the minimum service interval to generate a value z in step 402. In step 403, the scheduler calculates the number of allocation zones to be $2^m$, within a superframe based on the formula:

$$m = \lceil \log_2 z \rceil$$

wherein the function $\lceil x \rceil$ returns the smallest integer that is greater or equal to x. Thus the number of allocation zones depends on the duration of superframe and the minimum service interval of the existing applications, or the types of applications the QoS access point (QAP) intends to support. The number of allocation zones n will be the smallest power of 2 greater or equal to the division of the superframe duration and the minimum service interval to support.

For slot-based systems such as UWB, a superframe is organized into allocation zones by subdividing (402) the superframe into $2^m$ contiguous pieces with equal durations, where m=(1, 2, 3, ... ). This ensures a power of 2 number of allocation zones which can be parsed out for transmission opportunity. For example, the WiMedia UWB MAC 1.0 calls for a 256 MAS superframe structured into 16 allocation zones (e.g., the x-axis of FIG. 3) and 16 row components (e.g., the y-axis of FIG. 3).

Regardless of whether the wireless transmission opportunity is slot-based or not, its superframe can be organized into a number of allocation zones n which is a power of 2. The beacon period resides in the first allocation zone (indexed by "0"), which is referred to as beacon zone.

Once the superframe is parsed into allocation zones, in order to efficiently account for both application service interval requirements as well as reservations of contiguous blocks of transmission opportunity, the allocation zones are organized into an ordered list of sets, called iso-zones each identified by an iso-zone index value. The iso-zones have periodical service intervals that are multiples of allocation zone duration. FIG. 3 depicts iso-zones with index values of 3, 2, 1, and 0 (with m equal to 4).

Figure 5:
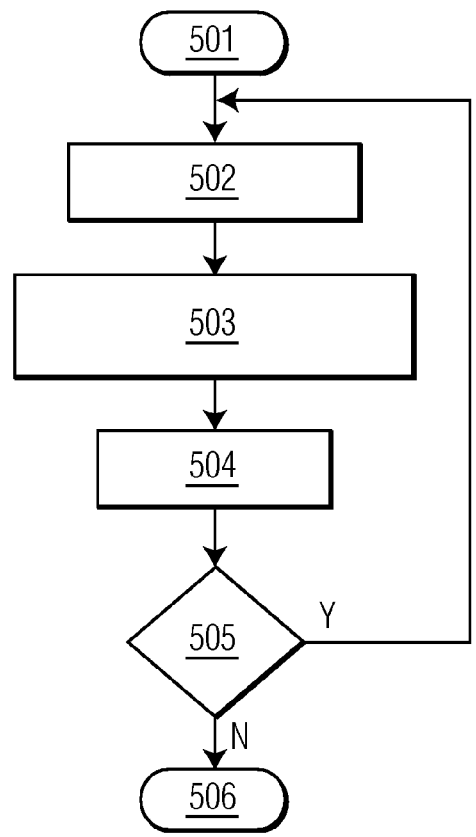
FIG. 5 is a flow chart depicting a method of generating an allocation map.

As an illustration of the formation of iso-zones. FIG. 5 depicts a flow chart diagram for organizing a superframe's allocation zones into iso-zones by a marking process. In step 501, an application marks a first allocation zone after the beacon zone with an iso-zone index value equal to m−1, e.g. 3. This can be allocation zone 1 in FIG. 3. In step 502, the application decrements the iso-zone index value by 1 and marks a second subsequent allocation zone with the decremented iso-zone index value. This can be allocation zone 2 in FIG. 3 which is assigned iso-zone index value 2. The application then mirrors the iso-zone index value of the first allocation zone in a third allocation zone with respect to and subsequent to the second allocation zone in step 503. An example of this mirroring is to assign allocation zone 3 in FIG. 3 with the same iso-zone index value as allocation zone 1. The mirroring refers to a mirror image iso-zone index values for the allocation zones 1 and 3 on opposite sides of allocation zone 2 in FIG. 3.

In step 504, the process repeats whereby the steps of decrementing, marking, and mirroring continue. For example, in FIG. 3, allocation zone 4 is assigned an iso-zone index value of 1 which is a decremented value. Then allocation zone 3,2 and 1 are used for the mirroring step and allocation zones 5, 6, and 7 are marked with the iso-zone index values of allocation zones 3, 2, and 1 respectively. This process continues until step 505 determines that the marking step marks an allocation zone with an iso-zone index value equal to 0. In FIG. 3, this is allocation zone 8. This is the midpoint of the superframe (without considering the beacon zone in allocation zone 0). The application then performs an additional iteration of mirroring and marking in step 506. For example, once allocation zone 8 in FIG. 3 is marked with an iso-zone index value 0, mirroring takes place by marking allocation zones 9 through 15 with the iso-zone index values of allocation zones 7 through 1, respectively. Marking need not be physical marking. Marking may be assigning bits indicating the iso-zone index value of a particular allocation zone. And the goal of such mark process is to generate an ordered list of sets of allocation zones, or iso-zones. Such an ordered list is called allocation map.

Alternatively, the allocation map can be generated by a computer program without physical marking process, or computed manually in advance.

Figure 8:
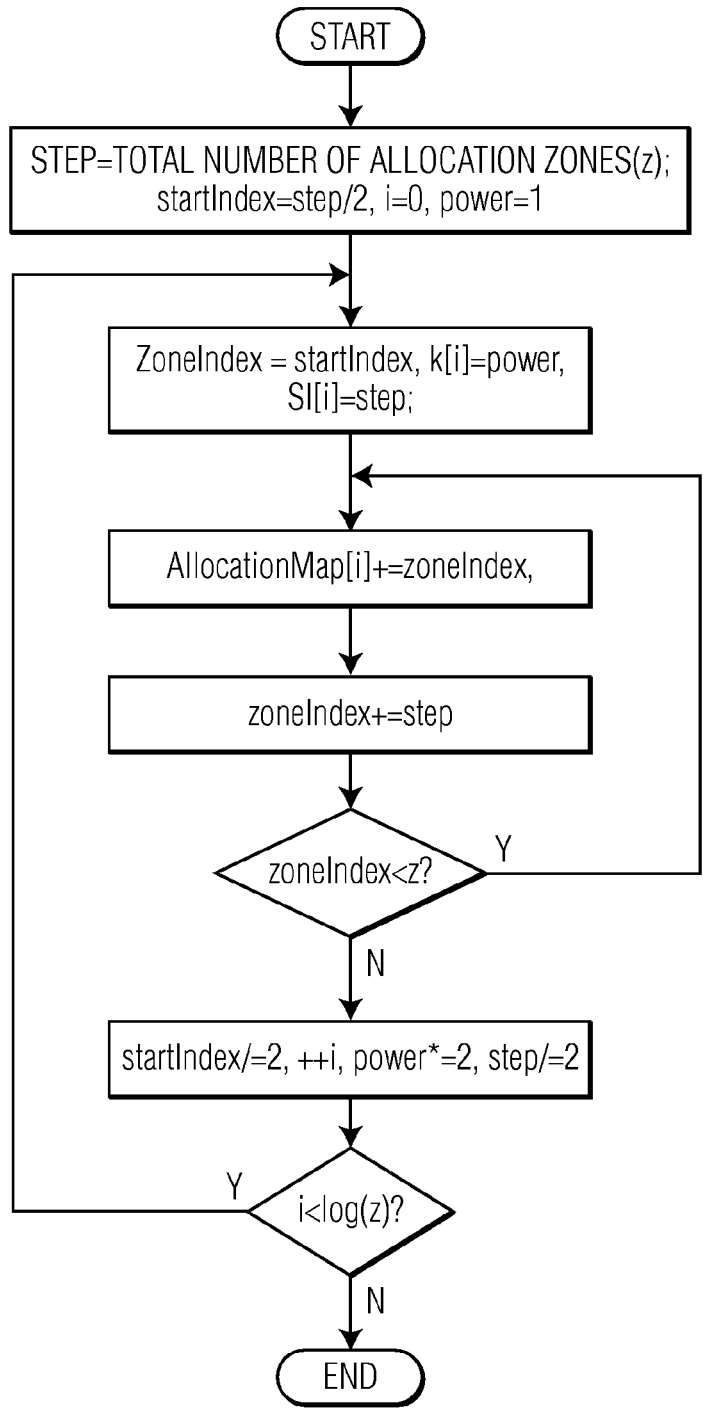
FIG. 8 is a flowchart of a computer program for generating an allocation map.

FIG. 8 depicts a flowchart of such program.

Table 1 depicts an allocation map that stores an ordered list of the iso zone index, the number of zones the iso-zone comprises, periodical service interval and the allocation zones the iso-zone contains for each iso-zone:

TABLE 1

| Iso-zone Index | Number of zones (k) | Native SI (ms) | Allocation Zones |
|---|---|---|---|
| 0 | 1 | 16 * 4.096 | 8 |
| 1 | 2 | 8 * 4.096 | 4, 12 |
| 2 | 4 | 4 * 4.096 | 2, 6, 10, 14 |
| 3 | 8 | 2 * 4.096 | 1, 3, 5, 7, 9, 11, 13, 15 |

Once an allocation map is created, an application can search for transmission opportunity within a superframe.

Figure 6:
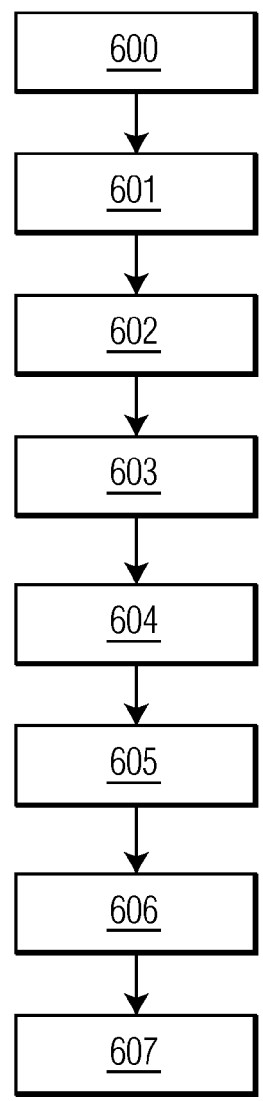
FIG. 6 is a flow chart depicting a method of transmission of information over a wireless network according to the invention.

FIG. 6 depicts the method for transmission of information over a wireless network. In step 601, an application organizes a superframe into a plurality of allocation zones as recited above. In step 602, the application organizing the allocation zones into iso-zones as recited above. In step 603, the application generates an allocation map (for example, table 1). In step 604, the application determines a periodic service interval based on a TSPEC, a delay requirement, and local resource of an application stream as recited above. In step 605, the application determines its medium time requirement based on the TSPEC, the delay requirement, and local resource of an application stream as recited above. In step 606, the application searches for transmission opportunity that accommodates the periodic service interval and the medium time required based on the allocation map. Once the application detects there is transmission opportunity available that satisfies its period service interval and medium time requirements, it transmits information in the superframe in step 607.

The search step 606 searches in ascending order from the lowest iso-zone index value for transmission opportunity for high-efficiency QoS requirements of an application.

Step 606 of searching for transmission opportunity includes calculating a number of allocation zones k corresponding to service interval requirements using the formula $$k = \left\lceil \frac{BP}{SI} \right\rceil$$

for low latency QoS requirements.

Then, the application determines a starting iso-index value from which the searching should begin by using allocation map as a lookup table based on k value determined above. The searching starts in ascending order from the starting iso-zone index value for transmission opportunity compliant with low latency requirements of an application.

Given the properties described above, the following principles maximize the size of contiguous unallocated medium time, and hence maximize the chance to meet requirement for incoming QoS requests and meanwhile satisfying the delay requirement of current request.

(a) Optimal schedules are the ones that always start with the lower-indexed iso-zone before scheduling in higher-indexed iso-zones.

(b) Optimal schedules are the ones that keep current allocation as flat as possible within each iso-zone. This actually indicates the following generalized Evenly Distributed MAS policy (EDMA) within each iso-zone in slot based medium access. i.e., each iso-zone allocation should not allocate more than n/k+1 MAS in each allocation zone within an iso-zone, where k is the number of allocation zones that the schedule is taking within the iso-zone under consideration.

Additional allocation maps (a.k.a, look-up tables (with n=16 and 32) are shown in 2-Table 4.

TABLE 2

Extended isozone based allocation map for total number of allocation zones (n) = 16

| Iso-zone Index | Number of zones (k) | Req./Act. SI (number of zones) | Allocation Zone Map |
|---|---|---|---|
| 0 | 1 | 16 | 8 |
| 1 | 2 | 8-15/8 | 4, 12 |
| 2 (Partial) + 0 | 3 | 6-7/6 | 2, 8, 14 |
| 2 | 4 | 4-5/4 | 2, 6, 10, 14 |
| 3 (Partial) + 1 | 6 | 3 | 1, 4, 7, 9, 12, 15 |
| 3 | 8 | 2 | 1, 3, 5, 7, 9, 11, 13, 15 |
| 3 + 2 + 1 + 0 | 15 | 1/1, 2 | All |

TABLE 3

Extended isozone based allocation map for total number of allocation zones (n) = 32

| Iso-zone Index | Number of zones (k) | Req./Act. SI (number of zones) | Allocation Zone Map |
|---|---|---|---|
| 0 | 1 | 32 | 16 |
| 1 | 2 | 16-31/16 | 8, 24 |
| 2 (Partial) + 0 | 3 | 12-15/12 | 4, 16, 28 |
| 2 | 4 | 8-11/8 | 4, 12, 20, 28 |
| 3 (Partial) + 1 | 6 | 6, 7/6 | 2, 8, 14, 18, 24, 30 |
| 3 | 8 | 4, 5/4 | 2, 6, 10, 14, 18, 22, 26, 30 |
| 4(Partial) + 1 | 12 | 3 | 1, 4, 7, 9, 12, 15, 17, 20, 23, 25, 28, 31 |
| 4 | 16 | 2 | 1, 3, 5, 7, 9, 11, 13, 15, 17, 19, 21, 23, 25, 27, 29, 31 |
| 4 + 3 + 2 + 1 + 0 | 31 | 1/1, 2 | All |

TABLE 4

Efficiency-optimised extended isozone based allocation map for total number of allocation zones (n) = 32

| Iso-zone Index | Number of zones (k) | Req./Act. SI (number of zones) | Allocation Zone Map |
|---|---|---|---|
| 0 | 1 | 32 | 16 |
| 1 | 2 | 16-31/16 | 8, 24 |
| 2-Partial + 0 | 3 | 12-15/12 | 4, 16, 28 |
| 4, 3-Partial + 0 | 3 | 11 | 5, 16, 26/6, 16, 27 |
| 2 | 4 | 8-10/8 | 4, 12, 20, 28 |
| {4, 3}-Partial + 0 | 5 | 7 | 2, 9, 16, 23, 30 |
| 3 (Partial) + 1 | 6 | 6 | 2, 8, 14, 18, 24, 30 |
| {4, 3}Partial + 0 | 7 | 5 | 2, 6, 11, 16, 21, 26, 30 |
| 3 | 8 | 4 | 2, 6, 10, 14, 18, 22, 26, 30 |
| {4, 3, 2}Partial + 0 | 11 | 3 | 1, 4, 7, 10, 13, 16, 19, 22, 25, 28, 31 |
| 4(Partial) + 1 | 12 | 3 | 1, 4, 7, 9, 12, 15, 17, 20, 23, 25, 28, 31 |
| 4 | 16 | 2 | 1, 3, 5, 7, 9, 11, 13, 15, 17, 19, 21, 23, 25, 27, 29, 31 |
| 4 + 3 + 2 + 1 + 0 | 31 | 1/1, 2 | All |

Figure 7:
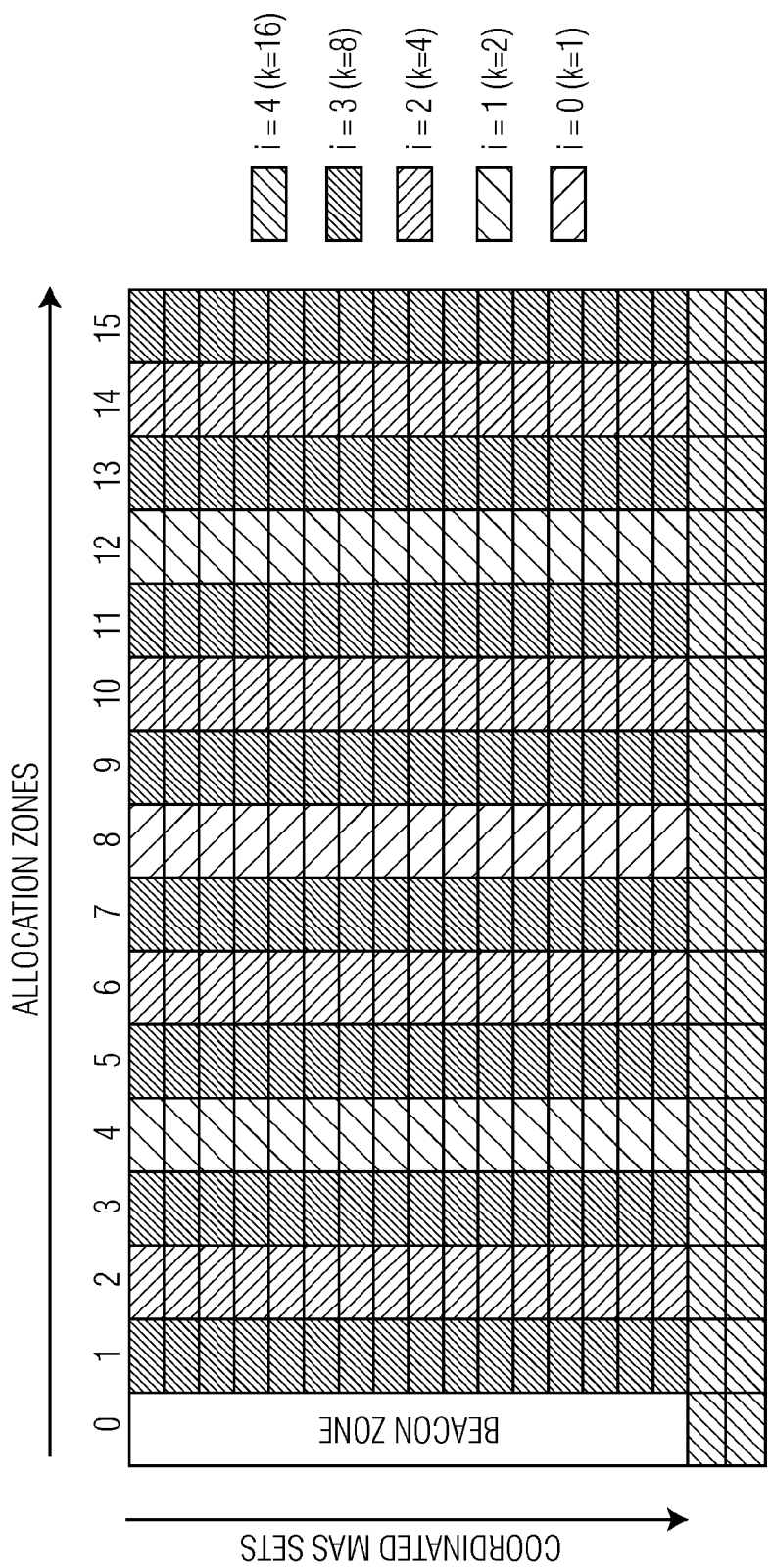
FIG. 7 is two dimensional representation of a superframe with a partially occupied beacon zone.

FIG. 7 depicts an iso-zone structure with a partially occupied beacon zone.

The iso-zone structure formed this way has the following properties:

1. Iso-zone i comprises $2^i$ allocation zones
2. Since $$2^m - 1 = \sum_{i=0}^{m-1} 2^i,$$

the iso-zone structure is therefore complete in the sense that the superframe is completely covered by m iso-zones formed this way without any missing allocation zones, nor overlapping.

3. $SI(i) < SI(i)$, $\forall k > i$; where $SI(i)$ denotes the native service interval that iso-zone i supports. This property indicates that if iso-zone(i) meets the application's delay requirement, so will iso-zone(k), $\forall k > i$.
4. $SI(\{k,i\}) < SI(k)$, $\forall k > i$; where $SI(\{k,i\})$ denotes the maximum service interval achieved by allocation in iso-zone i in additional to iso-zone k. This property indicates that if iso-zone k meets the application's delay requirement, additional allocation in any iso-zone(s) will not increase the worst-case delay.
5. Native service interval of iso-zone i can be achieved in iso-zone k, $\forall k > i$;

Example Algorithm for High-Efficiency Qos Requirements:

At the stage of determining the location of medium time, high-efficiency-low-power QoS requirements are already interpreted as the number of allocation zones n(e) (that is a function of efficiency factor e) in addition to bandwidth requirement in the form of medium time duration/or size t(g) (that is a function of service rate g). Given the requirement input of {t(g), n(e)}, the following algorithm maximizing the probability of satisfying the QoS requests for succeeding allocations while minimizing the number of allocation zones that the schedule takes to allocate medium time t(g):

1. Calculate unallocated medium time in all the allocation zones, i.e.

$$n = \sum_{i=1}^{z} unallocatedMediumTime(allocationzone[i]),$$

2. If (n≧t(g)), allocate t(g) according to policy (a) starting with iso-zone 0;
3. Within each iso-zone, follow policy (b)
4. Otherwise, report error of insufficient medium time.

For non-slot based systems such as IEEE 802.11, once the location is determined, the scheduler that resides in a QAP or QSTA may schedule the traffic stream according the location determined this way together with the duration determined by algorithms/mechanisms In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

In view of this disclosure it is noted that the various methods and devices described herein can be implemented in hardware and software known to achieve efficient medium access and sharing in a distributed wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

What is claimed is:

1. A method of transmission of information over a wireless network comprising:
    organizing a wireless medium into periodical superframes;
    organizing the superframe into a plurality of allocation zones;
    organizing the allocation zones into iso-zones;
    generating an allocation map;
    determining a maximum periodic service interval based on a Traffic Specification (TSPEC) including a latency requirement of an application stream, and local resource of a transmitting device;
    determining a medium time requirement based on the TSPEC including a latency requirement of an application stream, and local resource of the transmitting device;
    searching for transmission opportunity that accommodates the maximum periodic service interval and the medium time required based on the allocation map;
    transmitting information in the superframe upon finding transmission opportunity in the searching step.

2. The method of claim 1, wherein the step of organizing the superframe into allocation zones further comprises:
    determining a minimum service interval the wireless network can accommodate;
    dividing the duration of the superframe by the minimum service interval to generate a value x;
    determining the number of allocation zones to be $2^m$ based on a formula $$m=[\log_2 x]$$

wherein the formula returns a smallest integer that is greater or equal to x.

3. The method of claim 1, wherein the step of organizing the superframe into allocation zones further comprises: dividing the superframe into $2^m$ allocation zones, where m=(1, 2, 3, ... ).

4. The method of claim 1 wherein the step of organizing the allocation zones into iso-zones further comprises:
    marking a first allocation zone with a iso-zone index value equal to m−1, where m=(1, 2, 3, ... );
    decrement the iso-zone index value by 1;
    marking a second subsequent allocation zone with the decremented iso-zone index value;
    mirroring the first allocation zone in a third allocation zone subsequent to the second allocation zone;
    repeating the steps of decrementing, marking, and mirroring until the marking step marks an allocation zone with an iso-zone index value equal to 0; and
    performing one additional step of mirroring and marking.

5. The method of claim 4, wherein the mirroring step further comprises replicating the iso-zone index value applied to each allocation zones prior to an allocation zone marked in the marking step in subsequent allocation zones that are subsequent to the marked allocation zone.

6. The method of claim 1, wherein the allocation map comprises a table correlating the allocation zone with its marked iso-zone index value.

7. The method of claim 1, wherein the step of searching for transmission opportunity further comprises:
    searching in ascending order starting from a lowest iso-zone index value for transmission opportunity for high-efficiency QoS requirements of an application that does not have a latency requirement.

8. The method of claim 1, wherein the step of searching for transmission opportunity further comprises:
    calculating a number of allocation zones k corresponding to service interval requirements SI using the formula $$k = \frac{BP}{SI}$$

wherein BP is the duration of a superframe;
    determining a starting iso-index value from which the searching should begin by looking up the allocation map with the k value;
    searching in ascending order from the starting iso-zone index value for transmission opportunity compliant with low latency requirements of an application.

9. A wireless network comprising:
    a plurality of wireless devices, said wireless devices each comprising:
        a transmitter for transmitting a signal;
        a receiver for receiving the signal; and
        a processor; and
        a power source;
    wherein the processor organizes a superframe into a plurality of allocation zones; organizes the allocation zones into iso-zones; generates an allocation map; determines a maximum periodic service interval based on a Traffic Specification (TSPEC), a delay requirement, and local resource of an application stream; determines a medium time requirement based on the TSPEC, the delay requirement, and local resource of an application stream; searches for transmission opportunity that accommodates the maximum periodic service interval and the medium time required based on the allocation map; and directs the transmitter to transmit information in the superframe upon finding transmission opportunity in the searching step.

* * * * *